Figure 1:
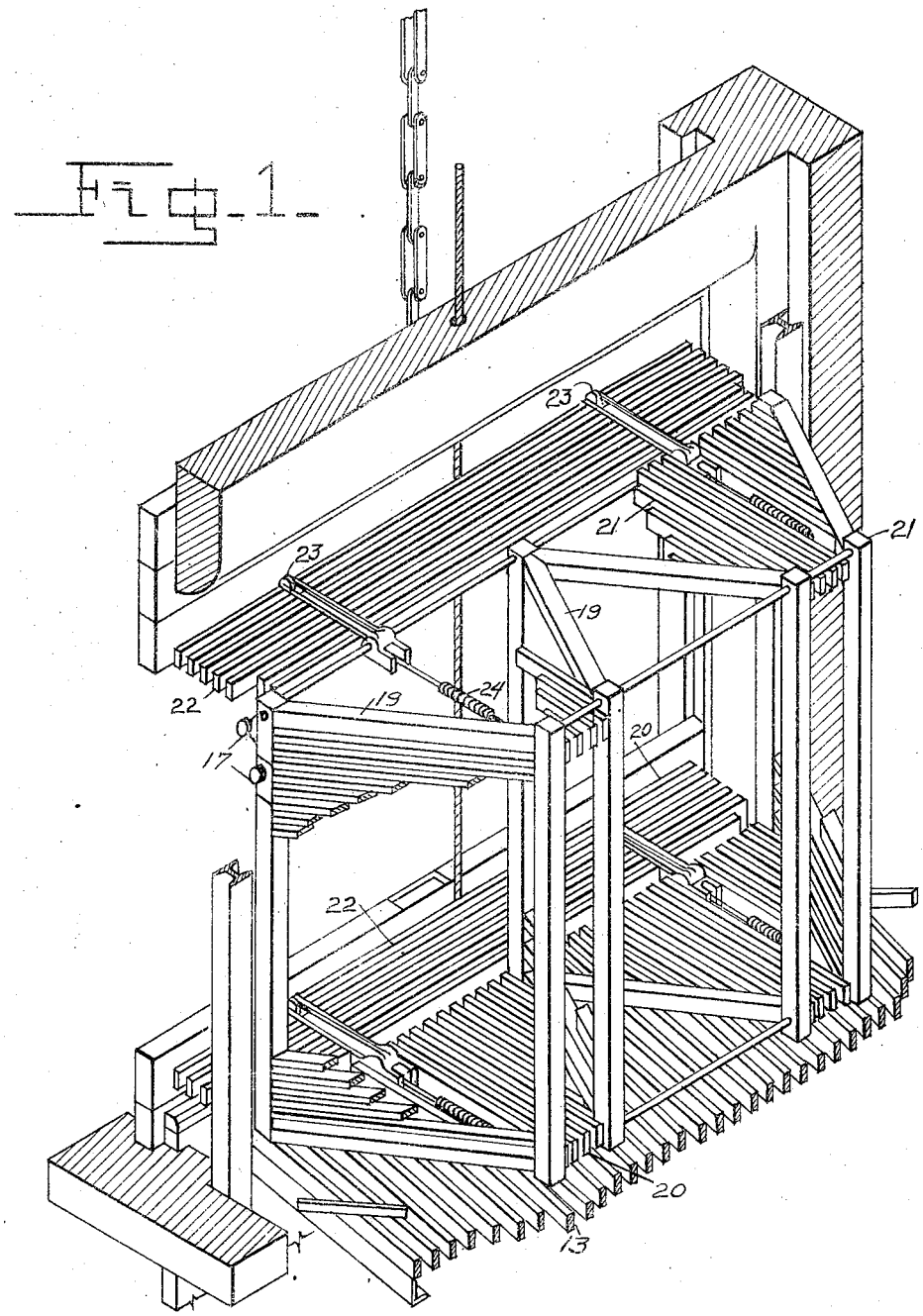

Patented Dec. 21, 1937

2,102,629

UNITED STATES PATENT OFFICE 2,102,629

FISH TRAP FOR FISH LIFTS

Lewis E. Knerr, Portland, Oreg., assignor to the Government of the United States of America, represented by the Secretary of War Application May 25, 1937, Serial No. 144,617

5 Claims. (Cl. 61—21)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to fish traps and is also disclosed in the application No. 146,016 entitled Method and apparatus for transferring migratory fish over a dam structure, and executed by Harlan B. Holmes, Henry Blood and Milo C. Bell, on June 2, 1937.

This invention generically is directed to a fish lock construction for transferring migratory fish over a dam structure, more especially it is directed to a fish trap mounted on a fish lift and adapted to coact with the entrance portal of a fish lock to prevent return of the fish through the entrance portal after the fish have entered the lock.

One object of this invention is to provide a fish trap adapted to be mounted upon a lift operating in a fish lock, the trap coacting with the entrance portal to the lock to present thereto a series of wide-mouthed passages converging to a restricted opening through which the fish may pass into the lock, the dimensions of the restricted passages being such as to prevent the return of the fish to the entrance portal.

Another object of this invention is to provide a fish trap adapted to ascend and descend the inner surface of the downstream wall of fish lock in fixed relation to said surface, while permitting tilting of the fish lift to aid discharge of the fish at the edge of the portal.

Another object of this invention is to provide a fish trap having facilities to provide a yieldable fish screen between the top and bottom of the fish trap, the screen being mounted so as to compensate for any variations in wall contour which may exist along the path of the travel of the fish trap as the lift ascends and descends the lock.

Another object of this invention is to provide a spring actuated fish screen in connection with the top and bottom of the fish trap, the screen being automatically operable to screening position when the trap is operatively disposed with respect to the fish entrance of the lock.

With these and other objects in view this invention consists in certain novel details of construction, combination and arrangement of parts to be more particularly hereinafter described and claimed.

Figure 2:
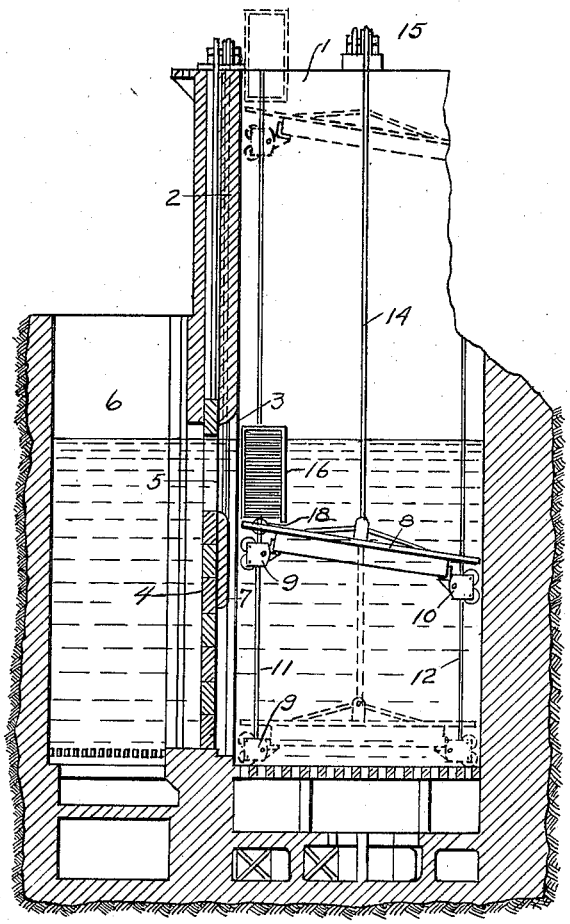

Referring to the accompanying drawings, in which corresponding parts are indicated by similar reference characters:

Fig. 1 is a fragmentary perspective partly in elevation and partly in section and illustrating the fish trap mounted upon the fish lift and operatively disposed with respect to the entrance portal of a fish lock, and Fig. 2 is a fragmentary transverse fish lock construction illustrating the relationship of fish lift, fish trap and entrance portal to the lock.

In the illustrated embodiment characterizing this invention (1) indicates a fish lock, (2) the downstream wall of the lock, (3) an entrance portal in the downstream wall, (4) adjustable units of a segmental weir, certain of the units being provided with cut-out portions to form an opening (5), which establishes communication between the entrance bay (6) and the interior of the lock (1), said opening being closed by a movable bar (7), as clearly shown in Fig. 2 of the drawings. A fish lift (8) operates in the lock between the entrance opening (5) and the exit opening of the lock (not shown).

The fish lift (8) is provided with a plurality of roller carriers (9) pivotally attached to fish lift (8) by pins (10), the roller carriers (9) being adapted to engage suitable rails such as I-beams (11) and (12), located adjacent the downstream and upstream walls of the lock respectively, as shown in Fig. 2. The spaced relationship between the roller carriers (9) and the I-beams (11) and (12) is preferably such that the fish lift (8) may be given a position of limited obliquity except at its extreme lower limit of travel when it may assume a substantially horizontal position, as indicated in dotted outline in Fig. 2.

The fish lift (8) is preferably floored with a grille structure (13), the individual bars of which are sufficiently spaced to prevent the passage therethrough of adult fish. These bars are preferably placed in a direction coinciding with the slope of the fish lift. Fish lift (8) is suspended by means of a cable (14) which passes over roller mechanism (15) and is operated by suitable power driven means (not shown).

Mounted on fish lift (8) is a fish trap (16), adapted to be vertically movable along the inside face of the downstream wall (2) of the lock. A plurality of rollers (17) are attached to the framework of the fish trap (16) and adapted to engage the I-beams (11) and (12) to maintain the vertical alignment of the fish trap structure (16). The weight of the fish trap structure is supported on fish lift (8) by means of an interposed roller (18). Fish trap (16) is also provided with pairs of walls (19), which converge from the entrance portal of the lock and terminate in restricted apertures (20) which are of a width to permit the passage therethrough of adult fish. The converging walls (19) are provided with a floor structure (20) and a ceiling structure (21) and are in the form of a suitable grille construction to bar the passage therethrough of adult fish. The floor (20) and the ceiling (21) of the fish trap are augmented by a pair of horizontally hinged spring loaded grilles (22) each of which is provided with suitable guide rollers (23). The spring loading of the grilles (22) is accomplished by any suitable means, as for instance by tension spring (24). The purpose of the hinged grilles or barriers (22) is to maintain a fish screen between the top and bottom of fish trap (16) and the inside face of the downstream wall of the fish lock structure, without regard to variations in the wall contour such as that which exists along the zone of transition from the wall to the segmental gate units (4) located immediately adjacent the entrance portal.

In conclusion, it will be manifest from the preceding structural outline that when the fish lift has been operatively disposed with respect to the entrance opening (5), the fish trap will present a pair of converging passages formed by walls (19), which will direct the fish to and through the restricted passages (20), and into the lock (1). It will also be seen that as the fish trap (16) passes the upper edge of the entrance portal the barriers or swinging grilles (22) will assume a position with respect to the segmental gate members (4) to effectively screen the top and bottom of the trap, as clearly shown in Figs. 1 and 2 of the drawings.

Having described my invention, what I claim as new and wish to secure by Letters Patent is:

1. The combination with a fish lock construction, and a fish lift operating in the lock, of a fish trap supported by the lift and adapted to cooperate with an entrance opening formed in the lock construction, said trap comprising a pair of barriers arranged to form a passage converging from the entrance portal to the interior of the lock, said passage terminating in a restricted fish outlet, a ceiling and flooring in connection with the barriers and means associated with the top and bottom of the fish trap and adjacent the entrance to the converging passage to prevent passage of fish above and below the fish trap.

2. The combination with a fish lock construction, and a fish lift operating in the lock, of a fish trap supported by the lift and adapted to cooperate with an entrance opening formed in the lock construction, said trap comprising a pair of grilled barriers arranged to form a passage converging from the entrance portal to the interior of the lock, said passage terminating in a restricted fish outlet, a grilled ceiling and flooring in connection with the barriers and means associated with the top and bottom of the fish trap and adjacent the entrance to the converging passage to prevent passage of fish above and below the fish trap.

3. The combination with a lock structure including a downstream wall having an entrance opening, of a fish lift operating in the lock structure and a fish trap mounted upon the lift, said trap comprising a plurality of walls arranged to provide convergent passages terminating in restricted outlets, floor and ceiling structures in connection with the walls and a pair of vertically spaced spring actuated pivotally mounted barriers affixed to the upper and lower portions of the walls adjacent the entrance to said converging passages.

4. The combination with a lock structure including a downstream wall having an entrance opening, of a fish lift operating in the lock structure and a fish trap pivotally mounted upon the lift, said trap comprising a plurality of grilled walls arranged to provide convergent passages terminating in restricted outlets, grilled floor and ceiling structures in connection with the walls and a pair of vertically spaced spring actuated pivotally mounted barriers affixed to the upper and lower portions of the walls adjacent the entrance to said converging passages.

5. The combination with a lock structure including a downstream wall having a gate controlled entrance opening, of a fish trap operating in the lock structure and including a plurality of grilled walls arranged to provide passageways converging from the entrance portal of the lock and terminating in restricted outlets, floor and ceiling structures in connection with the top and bottom portions of the grilled walls, and a pair of vertically spaced grilled barriers pivotally connected to the fish trap and adapted to compensate for variations in contour of the end surface of the downstream wall of said lock structure.

LEWIS E. KNERR.